United States Patent [19]

Le Beyec et al.

[11] Patent Number: 4,694,168

[45] Date of Patent: Sep. 15, 1987

[54] TIME-OF-FLIGHT MASS SPECTROMETER

[75] Inventors: Yvon Le Beyec, Bures sur Yvette; Serge D. Negra, Chilly Mazarin, both of France

[73] Assignee: Centre National de la Recherche Scientifique, Paris, France

[21] Appl. No.: 706,013

[22] Filed: Feb. 27, 1985

[30] Foreign Application Priority Data

Feb. 29, 1984 [FR] France ............................... 84 03127

[51] Int. Cl.[4] ............................................. B01D 59/44

[52] U.S. Cl. .................................... 250/287; 250/281

[58] Field of Search ............... 250/281, 283, 286, 287, 250/297, 309

[56] References Cited

U.S. PATENT DOCUMENTS 3,727,047 4/1973 Janes .................................. 250/287

3,769,513 10/1973 Delong ............................... 250/283

FOREIGN PATENT DOCUMENTS 956450 1/1957 Fed. Rep. of Germany ...... 250/287

OTHER PUBLICATIONS

International Journal of Mass Spectroscopy and Ion Physics, vol. 52, Nos. 2/3, Sep. 1983, pp. 223–240, Elsevier Science Publishers Amsterdam (NL); H. Danigel et al.: "A 252 Cf Fission Fragment-Induced Desorption Mass Spectrometer: Design, Operation and Performance", p. 228, lines 21–40; FIG. 5.

Analytical Chemistry, vol. 50, No. 7, Jun. 1978, pp. 985–991, American Chemical Society, Columbus, Ohio (US); M. A. Posthumus et al.: "Laser Desorption-Mass Spectrometry of Polar Nonvolatile Bio-Organic Molecules", p. 985, col. 2, Lines 3–19.

International Journal of Mass—Spectrometry and Ion Physics, vol. 20, No. 1, May 1976, p. 77–88, Elsevier Scientific Publishing Company, Amsterdam (NL); R. Igershein et al.: "Spectrometres de Masse a Temps de Vol Avec Guided de Particule", p. 82, line 5—p. 83, line 7; FIGS. 6 and 7.

*Primary Examiner*—Bruce C. Anderson

*Attorney, Agent, or Firm*—Roberts, Spiecens & Cohen

[57] ABSTRACT

The spectrometer includes an ion source, an ion mirror receiving the ions issued from the source, a first detector placed so as to receive the ions reflected by the mirror and a second detector disposed behind the mirror, all these components forming an assembly of axial symmetry. A reflex spectrum of the ions reflected by the mirror and received by the first detector can be obtained in parallel with a spectrum of the neutral species which may have appeared as a result of in flight decompositions of metastable ions and which are received by the second detector. This arrangement is particularly adapted to the study of metastable ions, processing means being provided for producing correlated reflex spectra where the contributions of ion fragments corresponding to received neutral fragments is enhanced.

6 Claims, 12 Drawing Figures

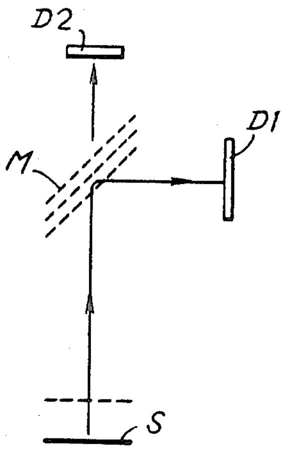
Fig. 1
(Prior art)
Fig. 2
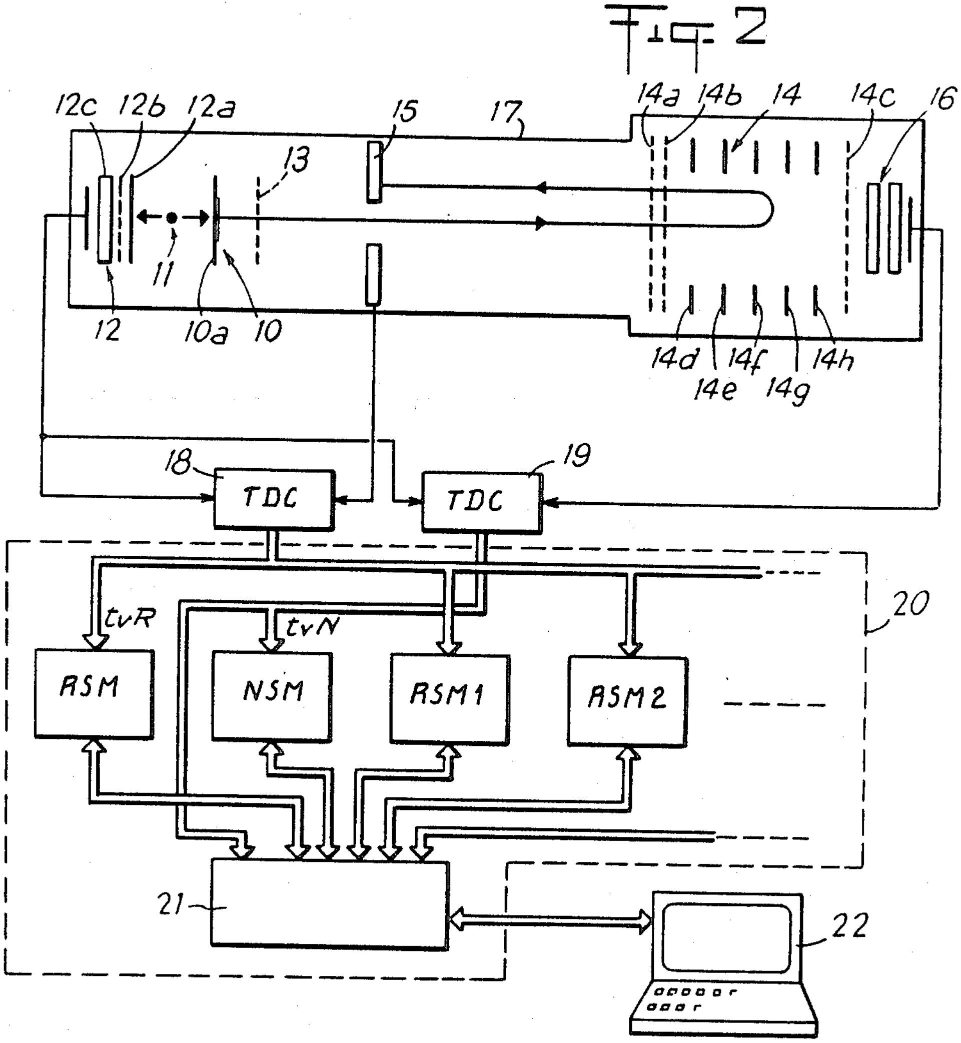

Reflex spectrum
Reflex spectrum
Reflex spectrum
Neutrals spectrum
10
13
15
14
16
d
Um
v
m⁺=m1⁺+mo
m1⁺
m1δ⁺
mo
Um1δ
d1δ
tm⁺
tm1⁺
tm1δ⁺
tmo

TIME-OF-FLIGHT MASS SPECTROMETER

FIELD OF THE INVENTION

The present invention relates to a time-of-flight mass spectrometer.

BACKGROUND

In a time-of-flight mass spectrometer, the ions issued from an ion source are accelerated by an electric field and their mass is determined by measuring the time of flight of the ions until they reach a detector.

In the conventional direct type time-of-flight spectrometer, ions are emitted at one end of the spectrometer and are received, after a direct flight, at the other end. It is possible with these spectrometers to mass-analyze all the ions issued from the source, including molecular ions which decompose in flight, after acceleration, giving rise in some cases to neutral species. But the resolution of direct flight spectrometers can often be inadequate.

It is wellknown to improve mass-resolution by lengthening the trajectory of the ions by reflection, using an ion mirror which receives the ions issued from the source and reflects them towards the detector. The ion mirror is formed by a set of parallel grids, spaced from one another and creating an electrical field capable of decelerating the ions and reflecting them. The ions, before being reflected, penetrate more or less deeply into the mirror, depending on their kinetic energy. It is therefore possible, by adapting a configuration of the mirror, to compensate for the difference in velocities of ions of a same mass, so that these ions reach the detector, at the same time, after reflection. But even though the use of a mirror brings some advantages, it does not permit one to carry out a complete analysis of metastable molecular ions which decompose in flight to give neutral species, the latter being obviously not reflected by the mirror.

It has been proposed to overcome this drawback by using a first detector placed in such a way as to receive the ions reflected by the mirror and a second detector placed behind the mirror in order to receive any neutral species present. Accompanying FIG. 1 shows a configuration such as disclosed in an Article by H. Danigel et al., published in the "International Journal of Mass Spectroscopy and Ion Physics", Vol. 52, Nos. 2/3 September 1983, pages 223–240, Elsevier Science Publishers Amsterdam (NL). The mirror M is tilted at 45° on the trajectory of the ions issued from source S, to reflect the ions towards a detector D1, in a direction perpendicular to the direction of emission, whereas the neutral species and the ions with sufficient kinetic energy to go through the mirror, are received by a detector D2.

This known construction presents a number of drawbacks.

First, it is, in practice, impossible to use the mirror to compensate for the differences in the ion's velocity. Moreover, the study of metastable ions would require a mirror capable of reflecting ions having quite different masses ranging from the mass of the non-decomposed ion to the masses of ionic fragments issued from in-flight decomposition. It would then be necessary to have a mirror of relatively substantial depth and the reflected ion trajectories would be at substantial distances one from the other, depending on the depth of penetration into the mirror. In order to be able to intercept all the reflected ions, it would then be necessary to have a detector D1 of large dimensions, which is difficult, if not impossible, to produce.

The use of a mirror of small depth to reflect ions whose kinetic energy is situated within a fairly wide range means that an intense electrical field is created in the mirror, which causes a sudden reflection. The differences in the dwelling times inside the mirror are then small, even for ions of very different kinetic energy. As a result, for metastable ions, the difference is extremely small between the time of flight of a non-decomposed ion and that of an ionic fragment after decomposition in flight, the complete ion and the ion fraction reaching the mirror with the same velocity. It is then impossible to conduct an accurate study of the metastable ions which implicates that this time-of-flight difference has to be measured.

SUMMARY OF THE INVENTION

It is therefore the object of the present invention to provide a time-of-flight spectrometer permitting an accurate and complete analysis of metastable molecular ions while preserving an excellent mass resolution, and of relatively simple and inexpensive structure.

This object is achieved according to the invention with a spectrometer of the type comprising a source of ions, a mirror receiving ions issued from the source, a first detector situated so as to receive the ions reflected by the mirror, and a second detector situated behind the ion mirror, whereby a spectrum of the ions reflected by the mirror and received by the first detector can be obtained, as well as a spectrum of any neutral species which may have appeared during the flight and been received by the second detector, in which, according to the invention, the source, the ion mirror, the first detector and the second detector form an assembly of axial symmetry.

The first detector is annular-shaped, providing a central passageway for the ions issued from the source.

The position of the elements of the spectrometer along the same axis makes a compact design possible. Moreover, the mirror can be given the desired depth without resulting in a dispersion of the trajectories of the ions reflected as a function of their masses, and there is no real obstacle to designing a mirror in such a way to compensate for the differences of velocities with ions of the same mass. As illustrated hereinafter, it becomes possible then to conduct an accurate analysis of metastable ions by correlation between the "reflex" spectrum derived from the signal of the first detector and the "neutral" spectrum derived from the signals of the second detector.

The ion source is, for example, formed by a solid surface bombarded with particles to produce the ions to be mass analyzed. Such bombardment may be performed with primary ions issued from a radioactive source $^{252}Cf$, with heavy ions accelerated by a cyclotron, with ions having an energy of several keV, with neutral atoms or else with a laser beam.

BRIEF DESCRIPTION OF THE DRAWINGS

The invention will be more readily understood on reading the following description with reference to the accompanying drawings, in which:

FIG. 1, already described hereinabove, illustrates a configuration of a time-of-flight spectrometer according to the prior art;

FIG. 2 is a diagrammatical cross-section of one embodiment of the spectrometer according to the invention;

In FIG. 2, reference 10 designates a source of molecular ions to be mass analyzed. Source 10 is formed by a metallic surface 10*a* on which molecules are deposited.

Figures 3A, 3B, 3C:
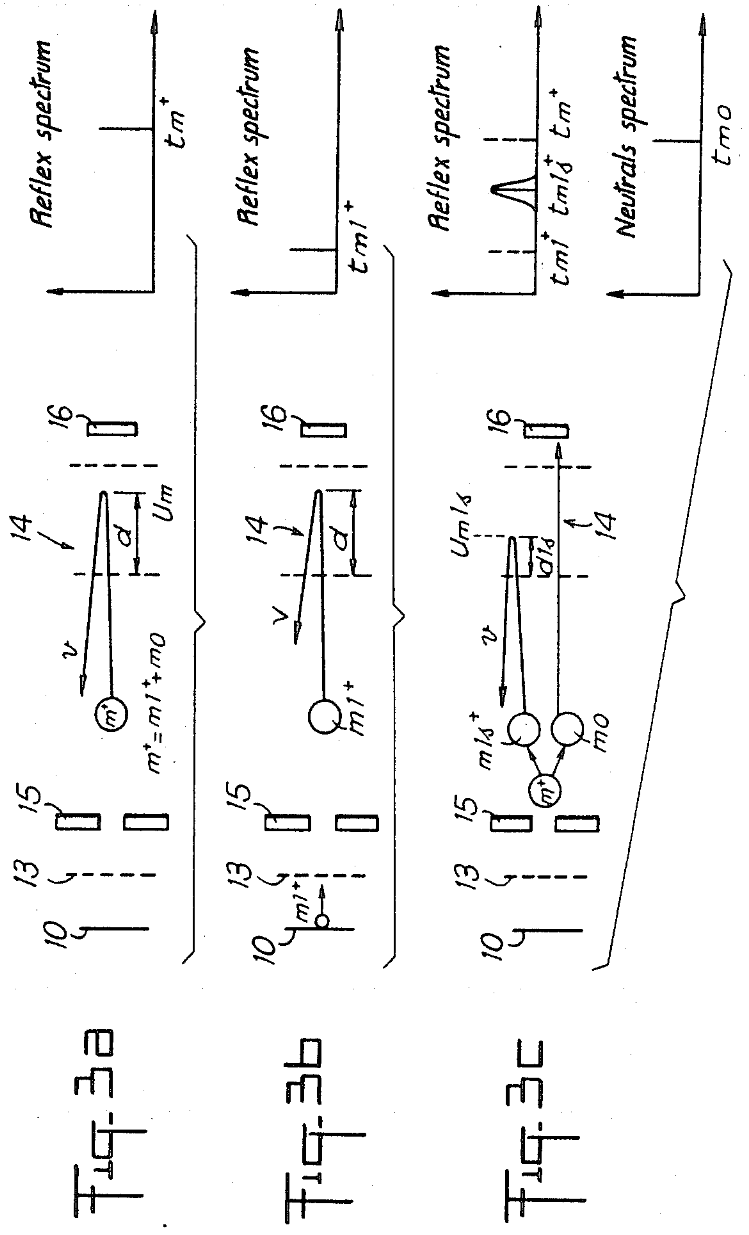
FIGS. 3*a* to 3*c* illustrate very diagrammatically trajectories of ions issued from the source and the corresponding spectra obtained.

A source 11 of primary ions is placed at equal distances between the source 10 of secondary ions and a detection device 12 designed to supply the starting signal.

In the illustrated example, the source 11 is a radioactive source of $^{252}$Cf. The californium 252 is a radioactive isotope which disintegrates while emitting two fission fragments in opposite directions.

One of the fragments emitted towards the back of the spectrometer is received on a metallic sheet 12*a* of the detection device 12 and ejects electrons therefrom. An electrical field is created between the sheet 12*a* and an electrode 12*b* to accelerate the ejected electrons rearwardly. These are received by a detector 12*c* situated at the back of the spectrometer and supplying an electrical pulse S0 which constitutes the starting signal.

The other fission fragment emitted towards the front releases by desorption the secondary ions from the metallic surface 10*a*. The released secondary ions are accelerated by an electrical field created between the metallic surface 10*a* and an electrode 13 which can for example, be brought to respective potentials of 10 to 20 kV and 0 kV.

An ion mirror 14 receives the emitted secondary ions and reflects them towards a detector 15.

The mirror 14 is situated close to the front end of the spectrometer. It comprises a first region delimited by two thin and parallel grids 14*a* and 14*b*; said first region constitutes a deceleration region for the ions received, when a delaying electrical field is created between grids 14*a* and 14*b*. The mirror then comprises a reflection region delimited by the grid 14*b* and a grid 14*c* between which is also created a delaying field. By way of example, the potentials of grids 14*a*, 14*b*, and 14*c* can be respectively equal to 0, $\frac{2}{3}$U and U with U=±8 kV or ±10 kV. Annular electrodes 14*d* and 14*h* are placed at regular intervals between grids 14*b* and 14*c*. The potential of these electrodes are so selected as to impose a uniform variation of the potential between grids 14*b* and 14*c*, thus conferring the required properties to the mirror. In particular, and as known per se, the mirror 14 is designed so as to compensate for velocity differences between ions of the same mass in order that these reach the detector 15 at the same time. Such compensation results from the fact that for equal masses, the fastest ions penetrate more deeply into the mirror before their moving direction is reversed.

The detector 15 is of annular shape and is placed on the rear side of the spectrometer, but before the acceleration space between the surface 10*a* and electrode 13. It enables the passage in its center of the secondary ions emitted by source 10 and issued from said acceleration space. The arrival of reflected ions on the detector, causes the emission of a pulse S1 which constitutes a stop signal.

A second detector 16 is placed at the front end of the spectrometer, behind ion mirror 14, in order to receive the species which have gone through the mirror without being reflected, and to supply, in response, a stop signal S2.

When mirror 14 is activated, the species reaching the detector 16 are the neutral ones which have appeared due to the decomposition during the flight of metastable molecular ions, the non-decomposed ions being for their part reflected by the mirror and received by detector 15.

When mirror 14 is not activated, a conventional operation of the spectrometer (direct flight, no reflection) is possible. It may for example be advantageous to compare the results obtained, on the one hand, in the form of an ion "reflex" spectrum and of a direct spectrum of neutral species, when mirror 14 is activated, and on the other hand, in the form of a direct spectrum of ions and neutral species, when mirror 14 is not activated.

According to one special feature of the invention, the assembly consisting of source 10 of secondary ions, ion mirror 14, first detector 15 and second detector 16, is of axial symmetry with respect to the ions optical axis. There is no deflection or return of the ions along an angle differing from that of the direct trajectory. The overall dimensions of the assembly is therefore relatively small, the different constitutive elements indicated hereinabove being housed in a straight tube 17 connected to a vacuum source (not shown).

The "reflex" mass spectrum is derived from signals S0, S1 whereas the "neutrals" mass spectrum is derived in a similar way from signal S0, S2.

To derive the "reflex" mass spectrum, a time-digital converter 18 is connected to detectors 12 and 15. Said converter is triggered in response to signal S0. Each time an ion reaching detector 15 causes the emission of a signal S1, converter 18 supplies digital information representing the time which has elapsed since its triggering, i.e. the time of flight of the ion. The converter 18 is, for example, the circuit whose principle is described by E. Festa and R. Sellem in the publication "Nuclear Instruments and Methods" No. 188(1981), page 99. Having received a starting signal, such a converter can accept, in a predetermined limited time interval (for example 16 or 32 microseconds) several stop signals (for example 32) and supplies in response to each stop signal, a digital word respresenting the time which has elapsed since the reception of the starting signal. The digital information thus supplied after every desorption is recorded in a memory circuit of a processing device 20 in order to be cumulated with those obtained in response to other desorptions and to work out a mass spectrum by noting the time of flight along the x-axis and the number of events counted through successive desorption along the y-axis. The mass spectrum presents peaks, each one indicating a repetition of identical time-of-flights, namely a repetition of reception of ions of the same mass corresponding to the coordinate of the peak along the x-axis.

A second time-digital converter 19 is connected to detectors 12 and 16 to provide the neutral mass spectrum.

The composing of mass spectra such as described briefly hereinabove, is achieved by means of a microprocessor circuit. In short, the digital information supplied by the converter 18 constitutes write addresses in a "reflex" spectrum memory (RSM) storing the events detected by detector 15. After a preset time of analysis by the operator, the contents of the RSM memory is read in order to work out graphical information permitting the display of the "reflex" spectrum on a cathode tube screen 22. In the same way, the digital information supplied by the converter 19 constitute write addresses in a neutral spectrum memory NSM, storing the events detected by detector 16. At the end of the analyzing time, the contents of the memory NSM is read in order to produce graphical information permitting the display of the neutral spectrum on the screen of tube 22. The writing and reading in memory RSM and NSM, the composing of graphical information and the control of the display on screen 22 are controlled by a circuit 21 in a manner known per se, which will not need to be described hereinafter.

Although it has been proposed to use fission fragments of $^{252}$Cf for desorption of secondary ions, said desorption may also be obtained with a laser beam directed on the surface 10*a* or with monocharged or multicharged ions of energy 10 to 100 KeV, with in the case of multicharged ions, a state of charge which can be high (for example up to 30+). Neutral atoms may also be used for impact desorption on surface 10*a*. Finally, ions with a potential energy of several MeV (for example up to 100 MeV or more), such as those delivered by a particle accelerator (tandem cyclotron, etc.) can also cause the desorption of secondary ions.

The spectrometer according to the invention is particularly advantageous in that it enables, with a simple structure, to combine a high mass resolution, due to reflection by an ion mirror, with a possibility of detecting neutrals which, in certain cases, contribute for a large part to the molecular "peak" of the resulting spectrum. By way of indication, when used with reflection, a mass resolution of about 2500 can be obtained, whereas when used with direct flight, said mass resolution only reaches about 600.

The use of the spectrometer for studying metastable molecular ions will now be described in detail.

FIG. 3*a* illustrates the trajectory of a metastable molecular ion m+ between source 10 and detector 15, assuming that the ion does not decompose in flight. The ion m+ is accelerated up to a velocity v and penetrates into the mirror to a depth d where a potential Um prevails, said depth d being a function of the kinetic energy of the ion m. FIG. 3*a* also shows the contribution of the ions m+ to the reflex spectrum in the form of a spectral line at time of flight tm+.

In the case of FIG. 3*b*, it is assumed that the metastable ion m+ is decomposed virtually at the passage of the primary ion or a very brief moment after. For simplification purposes, it is also assumed that the decomposition gives rise to an ion fragment m1+ and to a neutral fragment m0 (m+→m1++m0). Ion m1+ is accelerated up to a velocity V and penetrates into the mirror as far as depth d. FIG. 3*b* also shows the contribution of ion fractions m1+ in the reflex spectrum in the form of a spectral line at time of flight tm1+ ahead of time tm+.

In the case of FIG. 3*c*, it is assumed that the decomposition of metastable ion m+ occurs after it emerges from the acceleration space. Ions m1s+ and neutral m0 fragments retain velocity v. The neutral fragment will then reach the detector 16 after a time of flight tm0 which corresponds to the time of flight tm+ of the non-decomposed metastable ion. Ion fraction m1s+ is reflected by mirror 14 but its dwelling time therein is less than that of ion m+ because, although their velocity is the same, their energy is different. Ion m1s+ penetrates to a depth d1s where a potential U1ms prevails. Ion fragment m1s+ then reaches the detector after a time-of-flight tm1s+ which is between tm1+ and tm+. FIG. 3*c* shows the contribution of the neutral fragments m0 in the form of a spectral line at time-of-flight tm0 (corresponding to tm+) in the neutrals spectrum and the contribution of ion frament m1s+ in the form of a peak at time of flight t1s+ (varying between tm1+ and tm+)in the reflex spectrum.

It is important to note that the difference between time of floght tm+ and tm1s+ comes from the difference dt between the dwelling times in mirror 14. Mass m1s of the ion fragment ms1+ is deduced from the measurement of difference dt. We indeed have:

$$m-m1=K\cdot m^{\frac{1}{2}}\cdot dt,$$

m being the mass of ion m+ and K being a coefficient which is determined by gauging, using a metastable molecular ion whose decomposition reaction is well known. The value of dt is determined from the "reflex" spectrum by measuring the difference between the axes of the peaks at times tm+ and tm1s+. The decomposition of the metastable ion in flight is accompanied by a more or less sensitive modification of the trajectory and of the velocity of the fragments with respect to the trajectory and to the initial velocity of the ion; the result is a broadening of the peak of the ion fragment with respect to the peaks of the non-decomposed ions, on the reflex spectrum. Thus, in order to have results of sufficient accuracy, it is important that the two peaks at times tm+ and tm1s+ be very distinct one from the other, hence that the difference between the dwelling times in the mirror be significant. This cannot be so in the case of a mirror of small depth with an electrical field of very high intensity and reflecting, suddenly and substantially uniformly, ions whose masses are within a rather wide range.

The peaks produced in the "reflex" spectrum by ion fragments issued from the decomposition in flight of metastable molecular ions can be relatively low with respect to the peaks produced by desorped ions non decomposed in flight.

According to a special feature of the invention, an enhancement of said peaks is achieved by the analysis of coincident information. Referring to FIG. 3*c*, this shows that the neutral and "reflex" spectra are correlated. In deed, assuming a 100% efficiency of the detection and of the transmission of the detected information, for each event accounted for in the neutrals spectrum (reception of a neutral fragment) there corresponds at least one event in the "reflex" spectrum (reception of at least one complementary ion fragment of the neutral fragment). When a peak appears in the neutrals spectrum at time tm0, a reflex spectrum correlated with mass m0 is derived, retaining the events detected by means of detector 15, only if an event is detected by means of detector 16 in a time window centered on tm0. Thus, there is produced a relative enhancement in the correlated reflex spectrum of the peaks of complementary ion fragments of the neutral fragment m0 since the events which do not coincide with the detection of a neutral fragment are not taken into account.

The correlated spectra are composed as follows:

A neutrals spectrum is first composed in order to enable the operator to visualize the peaks of neutral fragments and to predetermine time windows centered on each peak axis, for example a window (tm1, t1M) for a first peak, a window (tm2, t2M) for a second peak and so on. The limit values so predetermined are recorded.

The processing circuit 20 comprises, besides memories RSM and NSM, memories RSM1, RSM2, . . . designed to record the information necessary to the working out of correlated spectra.

Figure 4:
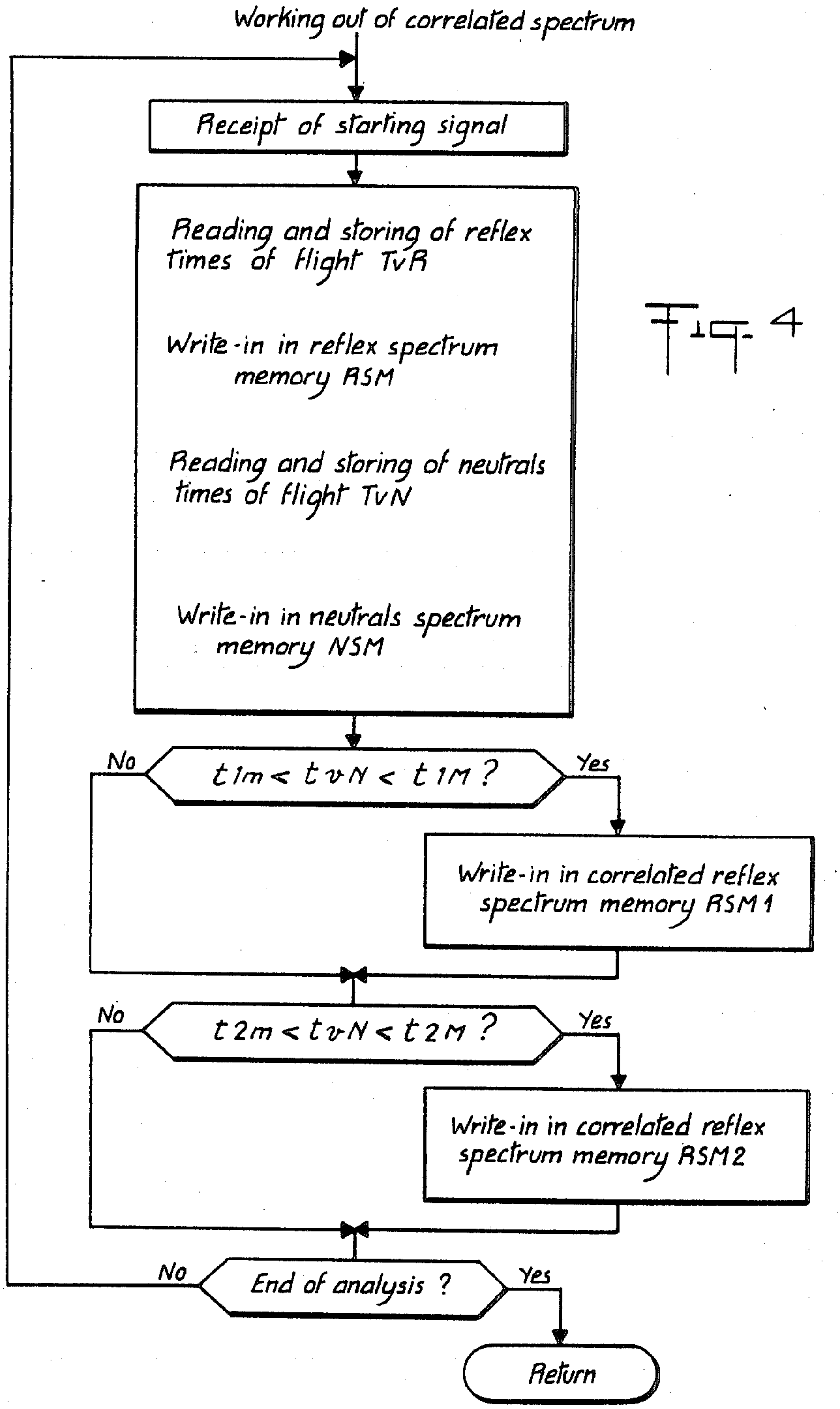
FIG. 4 is a flow diagram of operations conducted for the acquisition of the data necessary to work out the "neutral", "reflex" and "correlated" spectra.

Said working out is achieved under the control of circuit 21 by using a program whose flow diagram is shown in FIG. 4. It is assumed that two time windows (t1m, t1M) and (t2m, t2M) have been predetermined by the operator.

From the beginning of the study, the following operations are carried out:

reading and recording of the digital information tvR supplied by converter 18 ("reflex" time of flight) in response to every starting signal S0, write in memory RSM to the addresses defined by the recorded tvR informations, reading and recording of digital information tvN supplied by converter 19 (time of flight of neutrals), write in memory NSM to the addresses defined by the recorded tvN informations (The operations of reading, recording and write-in relative to the "reflex" times of flight can be carried out in parallel with those relative to the times of flight of neutrals), determining whether a neutral fragment is received during the first predetermined time window, by carrying out a test t1m<tvN<t1M; if this test is positive, write in the memory RSM1 at the addresses defined by the recorded tvR information, determining whether a neutral fraction is received during the second predetermined time window, by carrying out a test t2m<tvN<t2M; if this test is positive, write in the memory RSM2 at the addresses defined by the recorded TvR information, if the end of the analysis has not been requested, return to waiting for the reception of another signal, if the end of the analysis has not been requested, return to waiting for the reception of another signal, if the end of the analysis has been requested, return to the main program, for example to carry out a request for the display of a spectrum by conversion into graphical form of information recorded in either of memories RSM, NSM, RSM1, RSM2.

Figure 5A:
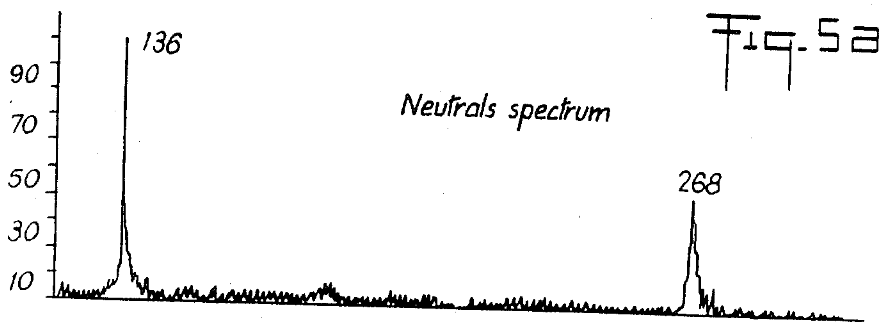
FIGS. 5*a* to 5*f* illustrate the "neutral", "reflex" and "correlated" spectra obtained with a particular source of ions.
Figure 5B:
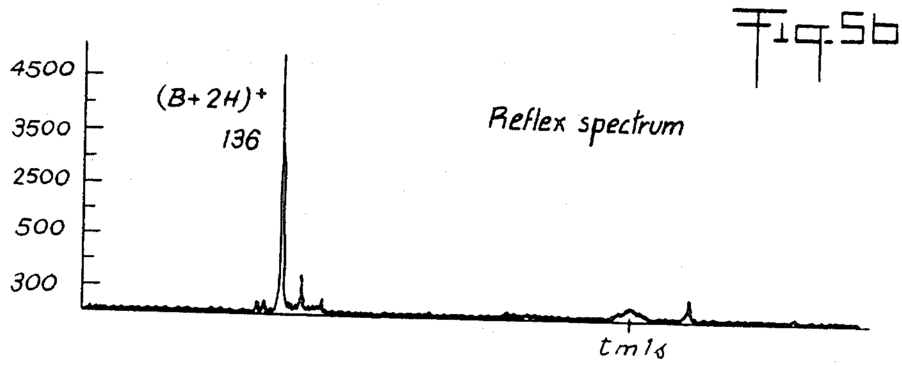
Figure 5C:
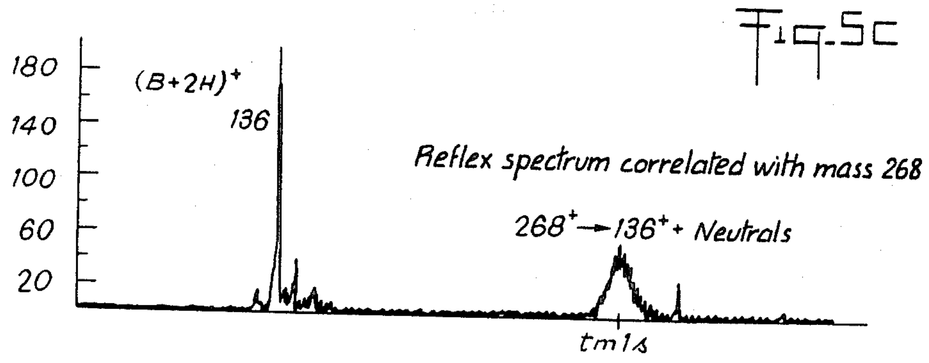

FIGS. 5*a*, 5*b* and 5*c* respectively illustrate a neutrals spectrum, a complete reflex spectrum and a correlated reflex spectrum obtained from the analysis of an adenosine organic compound.

The neutrals spectrum shows two peaks at times corresponding to masses 136 and 268. The complete reflex spectrum also shows two peaks at times corresponding to masses 136 and 268. The contributions of ions 136 and 268 are thus found in the neutral spectrum and in the reflex spectrum, depending on whether or not they have decomposed in flight. The peak at time tm corresponding to the mass 268 is not visible in FIG. 5*b*, the scale of time being different from the one used in FIG. 5*a*.

The reflex spectrum also presents a low peak broadened to time tm1s. This peak is much more evident in FIG. 5*c* which shows a reflex spectrum correlated with mass 268. The enhancement of the ion fragment peak, by the correlation is particularly clear. It is also noted, as already indicated, that the ion fragment peak is much more spread in time than the peaks of non-decomposed ions, this being due to the dispersion of velocity and trajectory resulting from the decomposition. The measurement of the difference between the coordinate tm1s and that tm of mass 268 enables one to determine the mass m1 of the ion fraction. In this example, decomposition takes the following form: $268^+ \rightarrow (B+2H^+) +$ neutrals and the ion fragment mass is equal to 136.

Figure 5D:
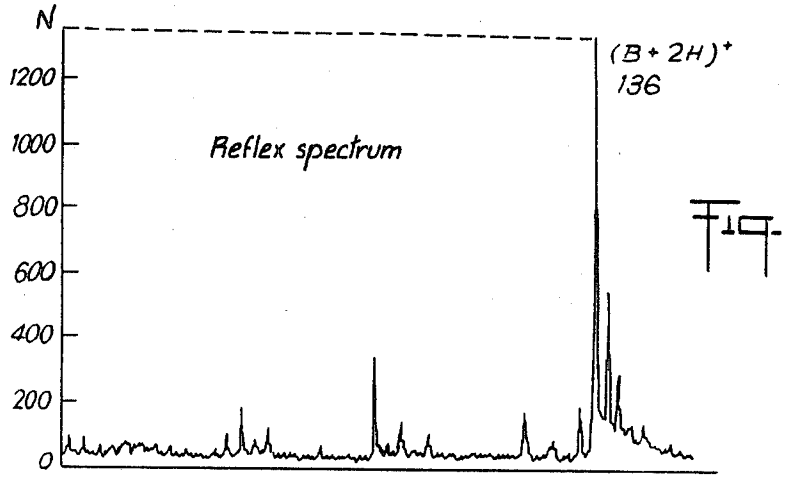
Figure 5E:
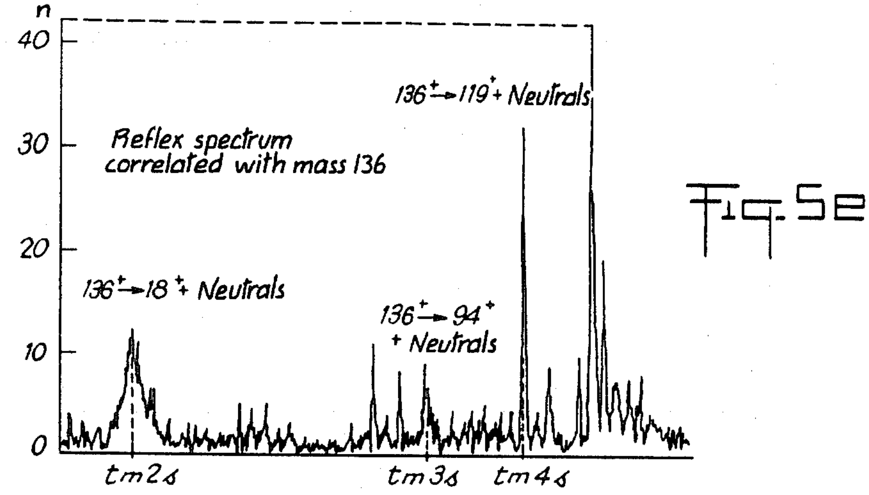
Figure 5F:
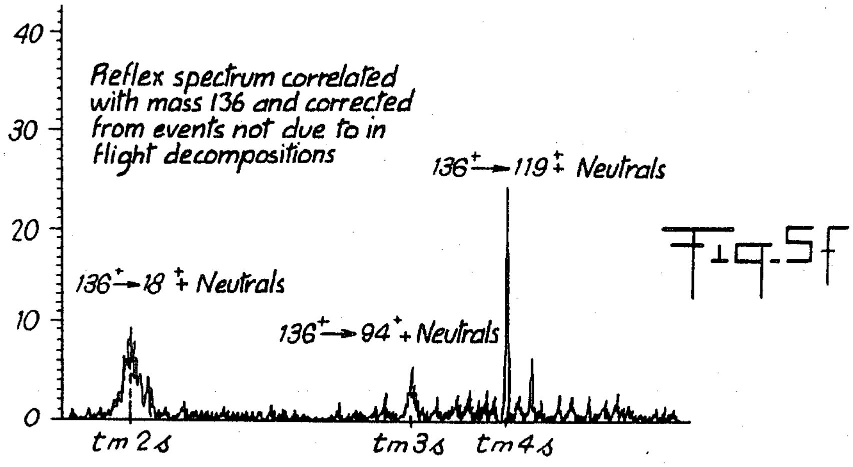

The neutrals spectra shown in FIG. 5*a* also show a peak for mass 136. FIGS. 5*d* and 5*e* show corresponding parts of the normal reflex spectrum and of the correlated "reflex" spectra with mass 136. The latter brings out widened peaks at times tm2s, tm3s and tm4s corresponding to decompositions of the ion 136+ respectively in $18^+ +$ neutrals, $94^+ +$ neutrals and $119^+ +$ neutrals.

An improvement of the enhancement of the peaks of ion fragments is yet possible by eliminating from the correlated "reflex" spectrum of FIG. 5*e* events which do not result from decompositions in flight. This is obtained by substracting from the correlated "reflex" spectrum a fraction of the complete "reflex" peak, said fraction being determined by the operator so as to eliminate a much recognizable peak of which it is known that it is not due to an ion fragment coming from a decomposition. In the illustrated example, it is possible to use, for example, the peak corresponding to the mass 136 as a basis. The operator determines the magnitude N of this peak on the normal "reflex" spectrum and the magnitude n of the corresponding peak on the correlated reflex spectrum in order to predetermine a ratio $k=n/N$. A corrected correlated spectrum of the events not due to decompositions in flight is then worked out under the control of circuit 21 by using a program comprising the following operations:

reading the contents N1 of memory RSM at a first address, reading the contents n1 of memory RSM1 at the same address, calculating $n'1 = n1 - kN1$, writing n'1 at a first address of a memory RSM'1 (not shown) and, passing to the next address until complete read out of memories RSM and RSM1.

The information contained in memory RSM'1 which is a linear combination of the information contained in memories RSM and RSM1, is ready in order to be converted in graphical form for subsequent display on the screen of the corrected correlated spectrum.

What is claimed is:

1. A time-of-flight spectrometer comprising a source of ions, an ion mirror receiving ions issued from said source, a first detector disposed to receive ions reflected by the mirror, and a second detector disposed behind the mirror so that a spectrum of the ions reflected by the mirror and received by the first detector can be obtained, as well as a spectrum of any neutral species appearing during flight and received by the second detector, said ion mirror forming with the ion source and the first and second detectors an assembly of axial symmetry, and having a depth sufficient to allow compensation for differences of velocities of ions having the same mass.

2. A spectrometer as claimed in claim 1 wherein said first detector is located between the ion source and the ion mirror and is of annular shape to form a central passageway for travel of the ions issued from the source.

3. A spectrometer as claimed in claim 1 further comprising:

energizing means cooperating with the ion source to cause the release of ions therefrom, means for supplying a starting signal indicative of the time at which ions are released from the ion source under the action of the energizing means, first time-digital conversion means having a first input connected to the starting signal supplying means and a second input connected to the first detector to deliver information representing the times of flight of ions received by the first detector, first storage means connected to the first time-digital conversion means for recording the number of events detected by the first detector as a function of the time of flight, so as to produce a spectrum of reflected ions, second time-digital conversion means having a first input connected to the starting signal supplying means and a second input connected to the second detector to deliver information representing the times of flight of neutral species received by the second detector, second storage means connected to the second time-digital conversion means for recording the number of events detected by the second detector as a function of the time of flight, so as to produce a spectrum of neutral species, at least one additional storage means connected to the first time-digital conversion means for recording events detected by the first detector receiving reflected ions, and correlation means connected to the second time-digital conversion means and to the additional storage means to allow the recording in said additional storage means of the number of events detected by the first detector as a function of the time of flight, only when a neutral species is detected by the second detector after a time of flight ranging between preset minimum and maximum values.

4. A spectrometer as claimed in claim 3, further comprising means for calculating and recording information resulting from a linear combination of the contents of the first storage means and of the additional storage means.

5. A spectrometer as claimed in claim 1 wherein said ion mirror includes a plurality of axially spaced grids at different potentials and annular electrodes between said grids to provide a uniform potential between the grids so that velocity differences between ions of the same mass are compensated and the ions reach the first detector at the same time.

6. A spectrometer as claimed in claim 5 wherein the grids and electrodes of the ion mirror extend over a length sufficient to allow the fastest ions to penetrate the mirror before they are reversed in direction to travel to the first detector.

* * * * *